US011710220B2

(12) United States Patent
Grilikhes

(10) Patent No.: US 11,710,220 B2
(45) Date of Patent: Jul. 25, 2023

(54) COMPRESSING DYNAMIC RANGE IN IMAGES USING DARKNESS GAMMA TRANSFER FUNCTION

(71) Applicant: INTEL CORPORATION, Santa Clara, CA (US)

(72) Inventor: Dmitry Grilikhes, Rehovot (IL)

(73) Assignee: INTEL CORPORATION, Santa Clara, CA (US)

( * ) Notice: Subject to any disclaimer, the term of this patent is extended or adjusted under 35 U.S.C. 154(b) by 792 days.

(21) Appl. No.: 16/578,772

(22) Filed: Sep. 23, 2019

(65) Prior Publication Data

US 2020/0020083 A1 Jan. 16, 2020

(51) Int. Cl.
| | |
|---|---|
| *G06T 5/00* | (2006.01) |
| *G06T 5/10* | (2006.01) |
| *G06T 11/00* | (2006.01) |
| *G06T 7/90* | (2017.01) |

(52) U.S. Cl.
CPC ............... *G06T 5/009* (2013.01); *G06T 5/10* (2013.01); *G06T 7/90* (2017.01); *G06T 11/001* (2013.01); *G06T 2207/20208* (2013.01)

(58) Field of Classification Search
CPC .. G06T 5/009; G06T 5/10; G06T 7/90; G06T 11/001; G06T 2207/20208; G06T 5/007; H04N 19/42
See application file for complete search history.

(56) References Cited

U.S. PATENT DOCUMENTS

2007/0047833 A1 3/2007 Zhang et al.

| | | | | |
|---|---|---|---|---|
| 2016/0277743 | A1* | 9/2016 | Ström | ................. H04N 19/426 |
| 2017/0330529 | A1* | 11/2017 | Van Mourik | ............ G09G 5/02 |
| 2018/0270489 | A1 | 9/2018 | Maymon et al. | |

OTHER PUBLICATIONS

European Patent Office, "Extended European Search Report," issued in connection with European Patent Application No. 20181547.9 dated Dec. 3, 2020, 9 pages.
Eilertsen et al., "A comparative review of tone-mapping algorithms for high dynamic range video," Computer Graphics Forum, Journal of the European Association for Computers, vol. 36, May 1, 2017, 28 pages.
Borer et al., "A 'Display Independent' High Dynamic Range Television System," IBC 2015 Conference, Sep. 11, 2015, 10 pages.
European Patent Office, "Communication pursuant to Rule 69 EPC," issued in connection with European Patent Application No. 20181547.9 dated Mar. 29, 2021, 2 pages.
European Patent Office, Communication Pursuant to Article 94(3) EPC, issued in connection with European Patent Application No. 20181547.9, dated Jun. 24, 2022, 7 pages.
Drago et al.: "Adaptive Logarithmic Mapping For Displaying High Contrast Scenes" Computer Graphics Forum, vol. 22, Issue 3, Sep. 2003, Iwate University, Morioka, Japan, pp. 419-426.

* cited by examiner

*Primary Examiner* — Christopher Wait
(74) *Attorney, Agent, or Firm* — Hanley, Flight & Zimmerman, LLC

(57) ABSTRACT

An example apparatus for compressing dynamic range includes an image receiver to receive an input image with a high dynamic range. The apparatus further includes a darkness gamma transfer calculator to calculate gain values for each output pixel via a darkness gamma transfer function. The apparatus also further includes a gain applicator to apply the gain values to color channel values of the input image to generate a compressed image.

22 Claims, 5 Drawing Sheets

COMPRESSING DYNAMIC RANGE IN IMAGES USING DARKNESS GAMMA TRANSFER FUNCTION

BACKGROUND

High dynamic range (HDR) images produced by cameras may be compressed to low dynamic range (LDR) to be displayed on LDR devices. For example, the range of luminance values of the compressed images may be reduced resulting in images with less contrast that can be displayed on the LDR devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
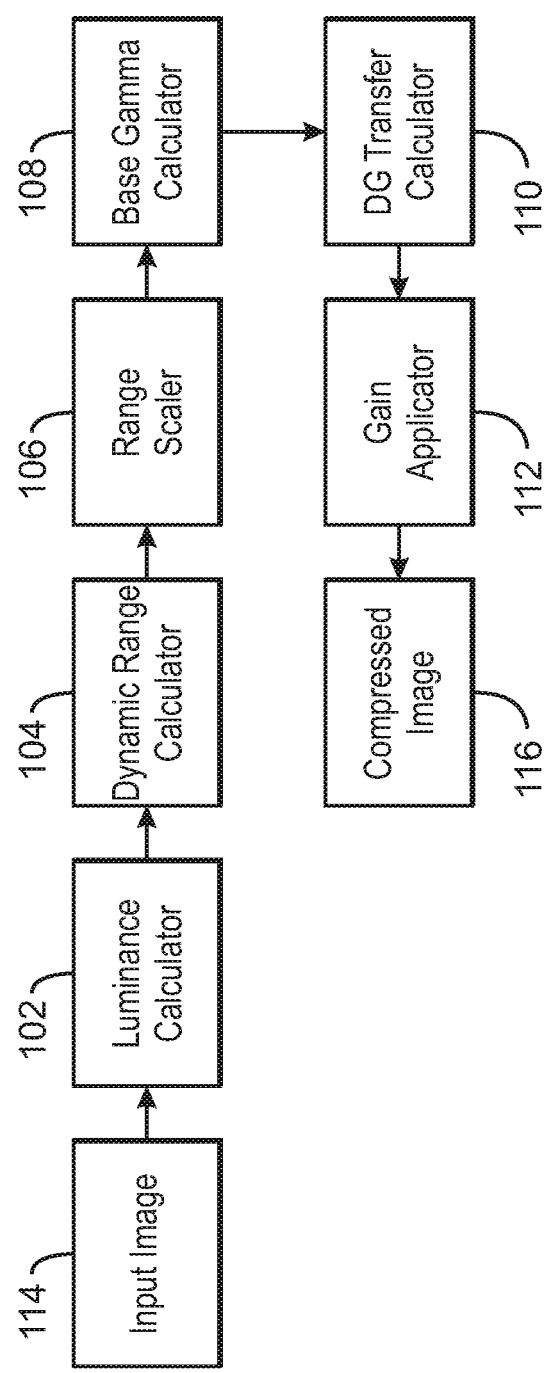
FIG. 1 is a block diagram illustrating an example system for compressing dynamic range using a darkness gamma transfer function.

High dynamic range (HDR) images, produced by modern cameras, may normally be compressed to a low dynamic range (LDR) to be displayed on LDR devices or to be saved in a standardized convenient format, which may only support LDR images. In many cases, most of the information in HDR images may be close to lower end of the range. A simple linear scaling to the desired range may therefore result in a very dark image, which may have the brightness of pixels fixed to make the image content visible. In some cases, a certain global, location independent, tone mapping (GTM) procedure may be applied, redistributing pixel values and actually performing HDR to LDR transformation. This transformation may be represented as a transfer curve, which is responsible for preserving the naturalness of the image with respect to the dark and light area details and contrasts. In various image processing chains, the global tone mapping (GTM) operation may be performed before additional local corrections and thus may affect the results of these additional local corrections. GTM performance may thus have a significant effect on output image quality. For example, transfer curves with a discontinuous first derivative can cause artifacts that may appear on images as unnatural shadows having comparatively sharp borders.

Most global tone mapping (GTM) techniques may implement one of two approaches: regular gamma-correction and logarithmic correction. Regular gamma-correction may be useful when the level of the compression or brightness correction used is low. However, the regular gamma-correction approach makes an output more natural and pleasant for the human eye, but, at the same time, has a significant drawback: close to zero, the derivative of its power function rises and makes the differences between closest input values too large on output to be acceptable. For example, any such discontinuity at zero may cause overexposed shadows. Logarithmic correction may be more useful for strong HDR cases. However, the logarithmic approach smoothly transforms the values of the input image, but the shape of its transfer curve, unlike gamma, may produce less natural results. For example, logarithmic approaches may have worse contrast and preserve less details.

The present disclosure relates generally to techniques for compressing high dynamic range (HDR) images. Specifically, the techniques described herein include an apparatus, method and system for compressing high dynamic range (HDR) images using a darkness gamma function. An example apparatus includes an image receiver to receive an input image with a high dynamic range. The apparatus includes a darkness gamma transfer calculator to calculate gain values for each output pixel via a darkness gamma transfer function. The apparatus also includes a gain applicator to apply the gain values to color channel values of the input image to generate a compressed image.

The techniques described herein thus enable finding a good GTM with no additional information about the target level of dynamic range compression. The techniques may be used to generate a transfer curve in a universal form, which makes the transfer curve applicable in any situation where such compression may be used. Moreover, the techniques may produce better images using less computational resources. For example, being applied to the image, the DG transfer function does not produce unnatural over-contrast in the dark areas and eliminates any artifacts of irregularity. Having a form similar to the regular gamma-correction, the algorithm's transfer function also makes a tone mapping which produces very natural-looking images. For example, the techniques may produce natural image or video output, saving details in dark areas without affecting contrast in mid-tones and highlights. Finally, the calculation process is simple and may normally use a single-digit amount of iterations.

FIG. 1 is a block diagram illustrating an example system for compressing dynamic range using a darkness gamma transfer function. The example system 100 can be implemented in the computing device 400 in FIG. 4 using the methods 200 and 300 of FIGS. 2 and 3. In various examples, the system 100 may be implemented as an image processing unit (IPU), as a system on chip (SOC), or any other image processing implementation.

The example system 100 includes a luminance calculator 102 communicatively coupled to a dynamic range calculator 104. The system 100 also includes a range scaler 106 communicatively coupled to the dynamic range calculator 104. The system 100 includes a base gamma calculator 108 communicatively coupled to the range scaler 106 and a darkness gamma (DG) transfer calculator 110. The system 100 includes a gain applicator 112 communicatively coupled to the DG transfer calculator 110.

As shown in FIG. 1, the system 100 may receive an input image 114 that has a high dynamic range and output a compressed image 116. For example, the input image 114 may have a dynamic range that exceeds the dynamic range of a display device (not shown). The system 100 may output a compressed image 116 that has a dynamic range within the supported dynamic range of the display device.

In the example of FIG. 1, the luminance calculator 102 can obtain the luminance of the input pixels of the input image 114. For example, the luminance calculator 102 can calculate the value of each maximal color channel as a luminance value for each pixel using the equation:

$$I_{in} = \max(R,G,B) \quad \text{Eq. 1}$$

where R, G, and B are the values of the red, green, and blue color channels for each pixel of the input image 114. The result may be a luminance image of pixels with luminance values.

The dynamic range calculator 104 may receive the luminance image from the luminance calculator and calculate the actual dynamic range of the luminance image. For example, the dynamic range calculator 104 can calculate a lower value indicating a maximum of those I which satisfy the inequality corresponding to the percentage of the pixels with luminance lower than I is less or equal than the 'dark percentage' dP using the equation:

$$I_d = \max_{pct(I_{in}<I) \leq dP}(I) \quad \text{Eq. 2}$$

where the dark percentage dP is the percentage of dark pixels defining the start of the actual input image dynamic range. For example, dP may be a predetermined constant. The dynamic range calculator 104 can then calculate a higher value indicating a minimum of those I which satisfy the inequation: percentage of the pixels with luminance lower than I is greater or equal than the 'bright percentage' bP using the equation:

$$I_b = \min_{pct(I_{in}<I) \geq bP}(I) \quad \text{Eq. 3}$$

where bP is the percentage of bright pixels defining the end of the actual input image dynamic range. For example, bP may be a predetermined constant.

The range scaler 106 can scale the dynamic range of the image values to equal [0 1]. For example, the range scaler 106 can scale the dynamic range using the equation:

$$I_{in} = \max\left(\min\left(\frac{I_{in} - I_d}{I_b - I_d}, 1\right), 0\right) \quad \text{Eq. 4}$$

The input at the base gamma calculator 108 may thus be an image or video frame in linear (before gamma-correction) RGB format, normalized to be inside the [0 1] segment of values. The base gamma calculator 108 can then calculate a base gamma value g using an iterative process. The base gamma calculator 108 can set a base gamma value, an iteration counter, and a difference value to a predetermined set of initial values. For example, the base gamma calculator 108 can set the initial base gamma value to a value of 1, the iteration counter to an initial value of 0, and the initial difference value to an initial value of 1. The base gamma calculator 108 can then set a working image TMP to an estimation image. For example, the estimation image may be generated as the luminance image $I_{in}$ with the output gamma applied. For example, the base gamma calculator 108 can set the working image TMP using the equation:

$$TMP = \text{outputGammaFunc}(I_{in}) \quad \text{Eq. 5}$$

For example, the parameter outputGammaFunc(x) may be the target gamma-correction function, defined by a standard supported by the target output device or file format. The base gamma calculator 108 can then iterate using the following loop while the iteration counter is less than a predetermined iteration threshold maxIter and the difference between the target tone average and currently estimated tone average is greater than the threshold tolerance, where maxIter is the number of iterations allowed for the search of the g parameter of the transfer function, used to avoid long calculation and tolerance is the tolerance, or the allowed error of average brightness estimation, for the search of the g parameter. First, the average of the estimation image may be calculated using the equation:

$$\text{aver} = \text{mean}(TMP) \quad \text{Eq. 6}$$

Then, an adjustment or fix f to the 'base' gamma may be calculated using the following equation:

$$f = (\ln(p*1024) - \ln(1024))/(\ln(\text{aver}*1024) - \ln(1024)) \quad \text{Eq. 7}$$

where p is a 'pivot' parameter, defining the target average level of brightness of the output image, a constant. Next, the working image TMP may be updated by applying a power function pow( ) to the previous estimation image using the equation:

$$TMP = \text{pow}(TMP, f) \quad \text{Eq. 8}$$

The base gamma value g may then be updated by multiplying it by the needed fix f:

$$g = g \cdot f \quad \text{Eq. 9}$$

Then, the absolute difference between the average of the estimation image and the target average level of brightness of the output image may be calculated using the equation:

$$\text{delta} = \text{abs}(\text{aver} - p) \quad \text{Eq. 10}$$

The counter may then be updated using the equation:

$$\text{cntr} = \text{cntr} + 1 \quad \text{Eq. 11}$$

In this manner, the base gamma calculator 108 can iteratively calculate a base gamma value g. For example, the base gamma value can be iteratively calculated using the method 300 of FIG. 3. In various examples, all the auxiliary parameters may be unallocated.

The DG gamma transfer calculator 110 can calculate gain values for each output pixel in the compressed image using the DG transfer function. For example, the DG transfer function may be represented via the Equation:

$$I_{out} = \begin{cases} \frac{(1-g) \cdot x_0^g}{\ln(a \cdot x_0 + 1)} \cdot \ln(a \cdot I_{in} + 1) \cdot \left(1 - \frac{I_{in}}{x_0}\right) + x_0^{(g-1)} \cdot I_{in}, & I_{in} < x_0 \\ I_{in}^g, & I_{in} \geq x_0 \end{cases} \quad \text{Eq. 12}$$

where $I_{in}$, $I_{out}$ are the input and the output image luminance, respectively, normalized to be between 0 and 1; g is the 'base' gamma parameter, which is found by the algorithm to obtain the target brightness of the output image; $x_0$ is a connection point between the two parts of the function, a constant between 0 and 1; and a is a parameter defining tone mapping in darkness, a predefined constant that defines the function's behavior close to zero. In various examples, the two parameters $x_0$ and a are predefined and are used to tune the shape of the transmission curve. In various examples, $x_0$ and a are received as input parameters. The DG gamma transfer calculator 110 may then calculate the gain for each pixel as a relation of $I_{out}$ to $I_{in}$, using the Equation:

$$\text{gain} = I_{out}/I_{in} \quad \text{Eq. 13}$$

The DG transfer function represented by Eq. 5 has a continuous derivative at any point and no infinite derivative at zero. Such design may yield a good image quality when the tone mapping based on the function is applied to images or video frames. In various examples, the DG gamma transfer calculator 110 thus finds the base gamma parameter and defines tone mapping automatically.

The gain applicator 112 may then apply the found gain to the input (R, G, B) values. In some examples, the application of the gain may be scaled the same way like the luminance image $I_{in}$. For example, the gain may be applied for each channel using the equations:

$$R_{out} = \max\left(\min\left(\frac{R - I_d}{I_b - I_d}, 1\right)\right) \cdot \text{gain} \qquad \text{Eq. 14}$$

$$G_{out} = \max\left(\min\left(\frac{G - I_d}{I_b - I_d}, 1\right) \cdot 0\right) \cdot \text{gain} \qquad \text{Eq. 15}$$

$$B_{out} = \max\left(\min\left(\frac{B - I_d}{I_b - I_d}, 1\right), 0\right) \cdot \text{gain} \qquad \text{Eq. 16}$$

The compressed image 116 may be a linear image ($R_{out}$, $G_{out}$, $B_{out}$) that is obtained. In various examples, the compressed image 116 can be used for further image processing. In some examples, the compressed image 116 may be output using a gamma function that was passed to the algorithm as a parameter outputGammaFunc(x). For example, the parameter outputGammaFunc(x) may be the target gamma-correction function, defined by a standard supported by the target output device or file format. In various examples, the parameter outputGammaFunc(x) may be supplied in any form that allows quick application to any value. For example, the parameter may be supplied via a lookup table or analytic formula, which may be easily implemented in program code.

The diagram of FIG. 1 is not intended to indicate that the example system 100 is to include all of the components shown in FIG. 1. Rather, the example system 100 can be implemented using fewer or additional components not illustrated in FIG. 1 (e.g., additional input images, compressed images, filters, receivers, transmitters, etc.).

Figure 2:
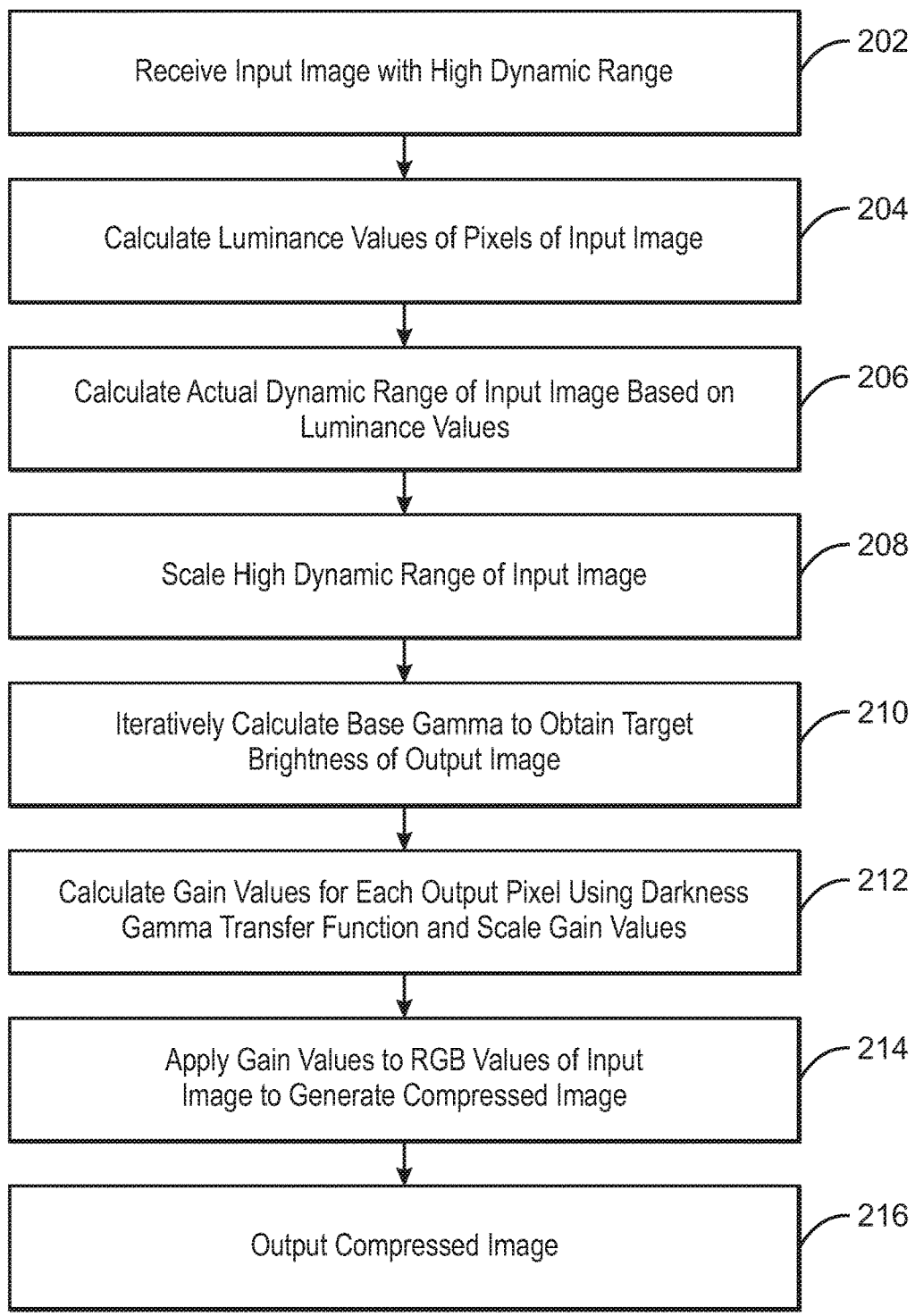
FIG. 2 is a flow chart illustrating a method for compressing dynamic range using a darkness gamma transfer function.

FIG. 2 is a flow chart illustrating a method for compressing dynamic range using a darkness gamma transfer function. The example method is generally referred to by the reference number 200 and can be implemented in the computer system 100 of FIG. 1, the processor 402 of the computing device 400 of FIG. 4, or the computer readable media 500 of FIG. 5.

At block 202, receive an input image with a high dynamic range. For example, the high dynamic range may exceed a dynamic range of a display device to display the compressed image.

At block 204, luminance values of pixels of the input image are calculated. For example, the value of each maximal color channel may be set as a luminance value for each pixel.

At block 206, an actual dynamic range of the input image is calculated based on luminance values of the input image. For example, a lower value may be calculated indicating a maximum of those I which satisfy an inequality corresponding to the percentage of the pixels with luminance lower than I is less or equal than a dark percentage. The percentage of dark pixels may define the start of the actual input image dynamic range.

At block 208, the high dynamic range of the input image is scaled. For example, high dynamic range of the image values may be scaled to equal [0 1].

At block 210, a base gamma is iteratively calculated to obtain a target brightness of the compressed image. In some examples, the base gamma may be calculated by iteratively updating the base gamma value until a counter exceeds a threshold number or until a difference between an average brightness of an estimation image and a target average level of brightness of the compressed image exceeds a threshold difference. For example, the base gamma may be iteratively calculated using the method 300 of FIG. 3.

At block 212, gain values are calculated for each output pixel via a darkness gamma transfer function. For example, the gain values may be calculated using a two-part darkness gamma transfer function including a logarithmic function applied near zero and a power function applied over a rest of the high dynamic range.

At block 214, the gain values are applied to color channel values of the input image to generate a compressed image. In various examples, the application of gain may take into account that the original R, G and B values of the color channels are cropped and scaled. For example, the gain values may be applied using the Equations described with respect to FIG. 1.

At block 216, the compressed image is output. For example, the compressed image may be output based on a received target gamma-correction function. In various examples, the compressed image may be a linear RGB image.

This process flow diagram is not intended to indicate that the blocks of the example method 200 are to be executed in any particular order, or that all of the blocks are to be included in every case. Further, any number of additional blocks not shown may be included within the example method 200, depending on the details of the specific implementation. For example, the method 200 may include using the compressed image for further image processing.

Figure 3:
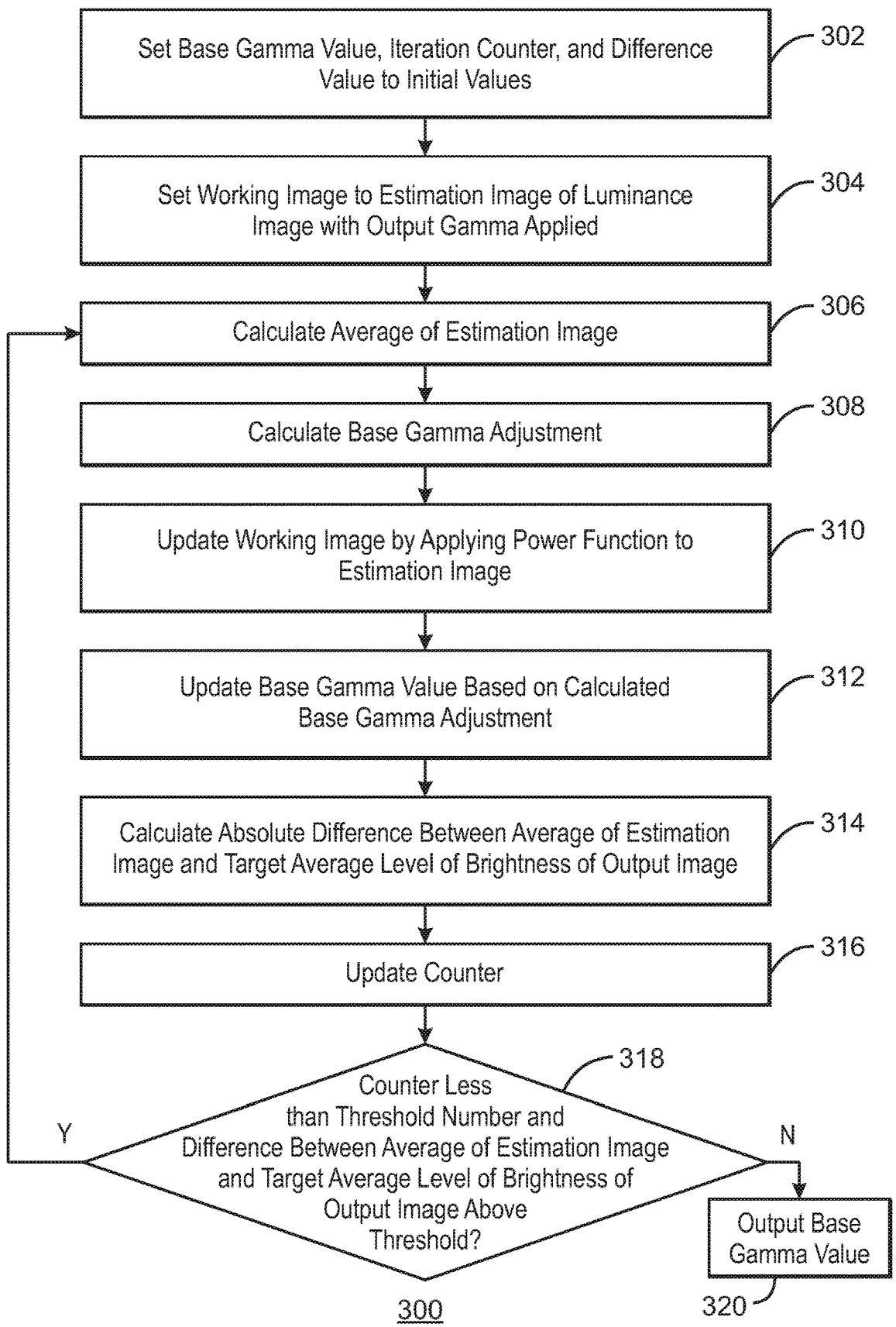
FIG. 3 is a flow chart illustrating a method for generating a base gamma to use in compressing dynamic range using a darkness gamma transfer function.

FIG. 3 is a flow chart illustrating a method for generating a base gamma to use in compressing dynamic range using a darkness gamma transfer function. The example method is generally referred to by the reference number 300 and can be implemented in the system 100 of FIG. 1, the processor 402 of the computing device 400 of FIG. 4, or the computer readable media 500 of FIG. 5.

At block 302, a base gamma value, an iteration counter, and a difference value are set to initial values. The difference value may be set to a small number controlling approximation quality. For example, the initial values may be set to a predetermined set of values. As one example, the initial value of the base gamma may be set to 1, the iteration counter may be set to 0, and the difference value may be set to 0.001.

At block 304, a working image is set to an estimation image of the luminance image with an output gamma function applied. For example, the output gamma function may be the target gamma-correction function, defined by a standard supported by the target output device or file format.

At block 306, an average of an estimation image is calculated. For example, the average of the luminance values of the pixels of the estimation image may be calculated.

At block 308, a base gamma adjustment is calculated. For example, the base gamma adjustment may be calculated based on Eq. 7 of FIG. 1.

At block 310, a working image is updated by applying a power function to the estimation image. For example, the working image may then be set as the estimation image with power function applied.

At block 312, the base gamma value is updated based on the calculated base gamma adjustment. For example, the base gamma value may be updated by multiplying the base gamma value by the calculated base gamma adjustment.

At block 314, an absolute difference between the average of the estimation image and a target average level of brightness of the compressed image is calculated. For example, the target average level of brightness of the compressed image may be a received predefined parameter.

At block 316, a counter is updated. For example, the counter may be incremented by a value of 1.

At decision diamond 318, a determination is made as to whether both a counter is less than a threshold number and a difference between an average of an estimation image and a target average level of brightness of an output image is above a threshold. If both conditions hold true, then the method may continue at block 306. If either the counter is not less than a threshold number or the difference between an average of an estimation image and a target average level of brightness of an output image is not above a threshold, then the method may continue at block 320.

At block 320, a base gamma value is output. For example, the base gamma value may then be used to calculate gain values as described in FIG. 2.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation.

Figure 4:
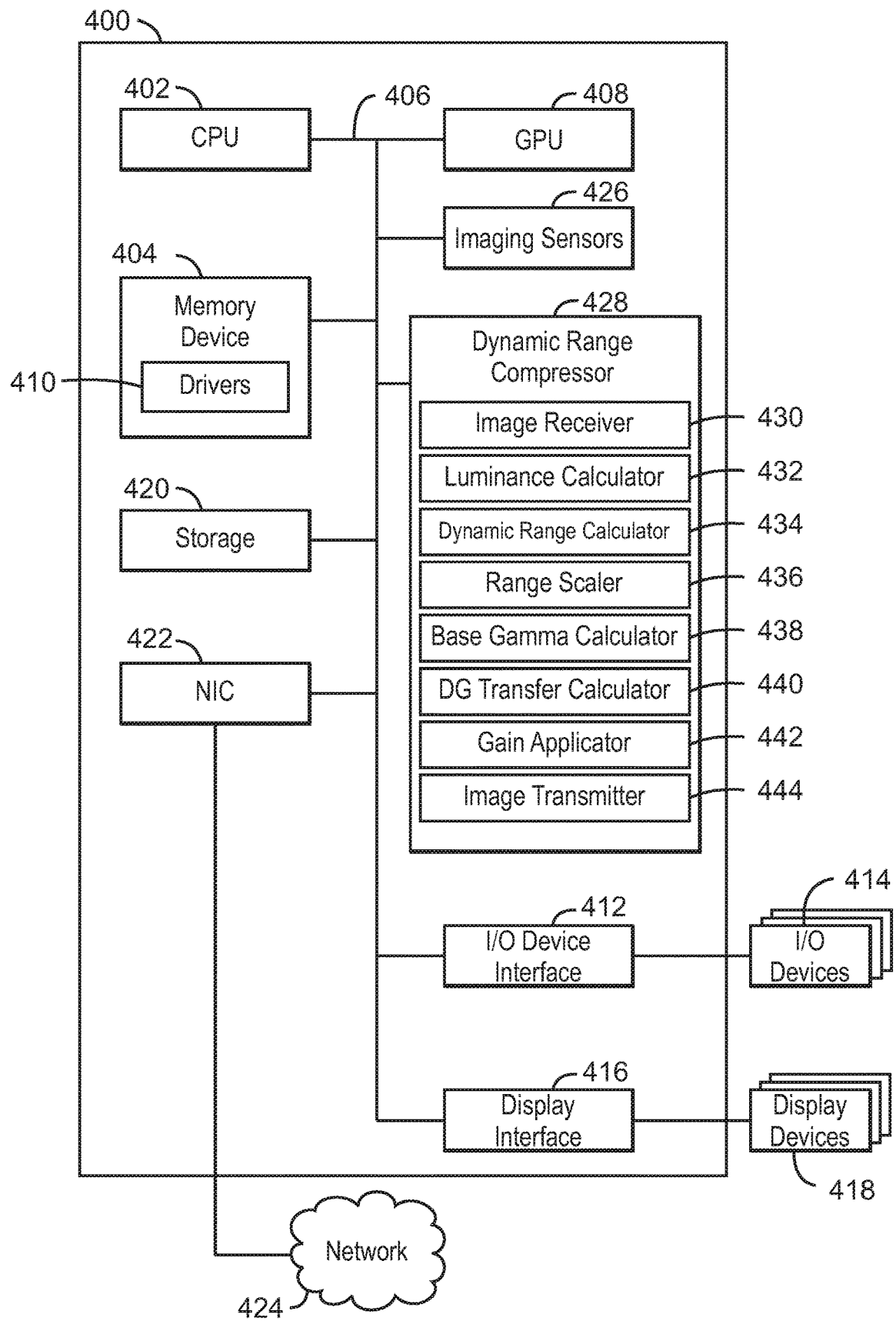
FIG. 4 is block diagram illustrating an example computing device that can compress dynamic range using a darkness gamma transfer function.

Referring now to FIG. 4, a block diagram is shown illustrating an example computing device that can compress dynamic range using a darkness gamma transfer function. The computing device 400 may be, for example, a laptop computer, desktop computer, tablet computer, mobile device, or wearable device, among others. In some examples, the computing device 400 may be a camera. The computing device 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the computing device 400 may include more than one CPU 402. In some examples, the CPU 402 may be a system-on-chip (SoC) with a multi-core processor architecture. In some examples, the CPU 402 can be a specialized digital signal processor (DSP) used for image processing. The memory device 404 can include random access memory (RAM), read only memory (ROM), flash memory, or any other suitable memory systems. For example, the memory device 404 may include dynamic random access memory (DRAM).

The memory device 404 can include random access memory (RAM), read only memory (ROM), flash memory, or any other suitable memory systems. For example, the memory device 404 may include dynamic random access memory (DRAM).

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400.

The memory device 404 can include random access memory (RAM), read only memory (ROM), flash memory, or any other suitable memory systems. For example, the memory device 404 may include dynamic random access memory (DRAM). The memory device 404 may include device drivers 410 that are configured to execute the instructions for generating images with compressed dynamic range. The device drivers 410 may be software, an application program, application code, or the like.

The CPU 402 may also be connected through the bus 406 to an input/output (I/O) device interface 412 configured to connect the computing device 400 to one or more I/O devices 414. The I/O devices 414 may include, for example, a keyboard and a pointing device, wherein the pointing device may include a touchpad or a touchscreen, among others. The I/O devices 414 may be built-in components of the computing device 400, or may be devices that are externally connected to the computing device 400. In some examples, the memory 404 may be communicatively coupled to I/O devices 414 through direct memory access (DMA).

The CPU 402 may also be linked through the bus 406 to a display interface 416 configured to connect the computing device 400 to a display device 418. The display device 418 may include a display screen that is a built-in component of the computing device 400. The display device 418 may also include a computer monitor, television, or projector, among others, that is internal to or externally connected to the computing device 400.

The computing device 400 also includes a storage device 420. The storage device 420 is a physical memory such as a hard drive, an optical drive, a thumbdrive, an array of drives, a solid-state drive, or any combinations thereof. The storage device 420 may also include remote storage drives.

The computing device 400 may also include a network interface controller (NIC) 422. The NIC 422 may be configured to connect the computing device 400 through the bus 406 to a network 424. The network 424 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 400 further includes imaging sensors 426. For example, the imaging sensors 426 may include one or more light sensors. In some example, the imaging sensors 426 may include filters. For example, the filters may be in the form of an RGB filter array, or any other suitable filter array.

The computing device 400 further includes a dynamic range compressor 428. For example, the dynamic range compressor 428 can be used to compress images with high dynamic range using a darkness gamma transfer function. The dynamic range compressor 428 can include an image receiver 430, a luminance calculator 432, a dynamic range calculator 434, a range scaler 436, a base gamma calculator 438, a darkness gamma (DG) transfer calculator 440, a gain applicator 442, and an image transmitter 444. In some examples, each of the components 430-444 of the dynamic range compressor 428 may be a microcontroller, embedded processor, or software module. The image receiver 430 can receive an input image with a high dynamic range. In some examples, the high dynamic range exceeds a dynamic range of a display device to display the compressed image. The luminance calculator 432 can calculate luminance values of pixels of the input image. The dynamic range calculator 434 can calculate an actual dynamic range of the input image based on luminance values of the input image. The range scaler 436 can scale the high dynamic range of the input image. The base gamma calculator 438 can iteratively calculate a base gamma to obtain a target brightness of the compressed image. For example, the base gamma calculator 438 can iteratively calculate an average of an estimation image, calculate a base gamma adjustment, update a working image by applying a power function to the estimation image, update the base gamma value based on the calculated base gamma adjustment, calculate an absolute difference between the average of the estimation image and a target average level of brightness of the compressed image, and update a counter. In some examples, the base gamma calculator 438 can iteratively calculate a base gamma value used to calculate the gain values, the base gamma calculator to iterate until a counter exceeds a threshold number or until a difference between an average brightness of an estimation image and a target average level of brightness of the compressed image exceeds a threshold difference. The DG transfer calculator 440 can calculate gain values for each output pixel via a darkness gamma transfer function. For example, the DG transfer calculator 440 can calculate the gain values using a two-part darkness gamma transfer function comprising a logarithmic function applied near zero and a power function applied over a rest of the high dynamic range. The gain applicator 442 can apply gain values to color channel values of the input image to generate a compressed image. The image transmitter 444 can output the compressed image. For example, the image transmitter 444 can output the compressed image based on a received target gamma-correction function corresponding to a target display device or target image format.

The block diagram of FIG. 4 is not intended to indicate that the computing device 400 is to include all of the components shown in FIG. 4. Rather, the computing device 400 can include fewer or additional components not illustrated in FIG. 4, such as additional buffers, additional processors, and the like. The computing device 400 may include any number of additional components not shown in FIG. 4, depending on the details of the specific implementation. Furthermore, any of the functionalities of the image receiver 430, the luminance calculator 432, the dynamic range calculator 434, the range scaler 436, the base gamma calculator 438, the DG transfer calculator 440, the gain applicator 442, and the image transmitter 444, may be partially, or entirely, implemented in hardware and/or in the processor 402. For example, the functionality may be implemented with an application specific integrated circuit, in logic implemented in the processor 402, or in any other device. In addition, any of the functionalities of the dynamic range compressor 428 may be partially, or entirely, implemented in hardware and/or in a processor. For example, the functionality of the dynamic range compressor 428 may be implemented with an application specific integrated circuit, in logic implemented in a processor, in logic implemented in a specialized graphics processing unit such as the GPU 408, or in any other device. In some examples, the dynamic range compressor 428 may be implemented in an image processing unit (IPU), a system on chip (SOC), or any other suitable image processing implementation.

Figure 5:
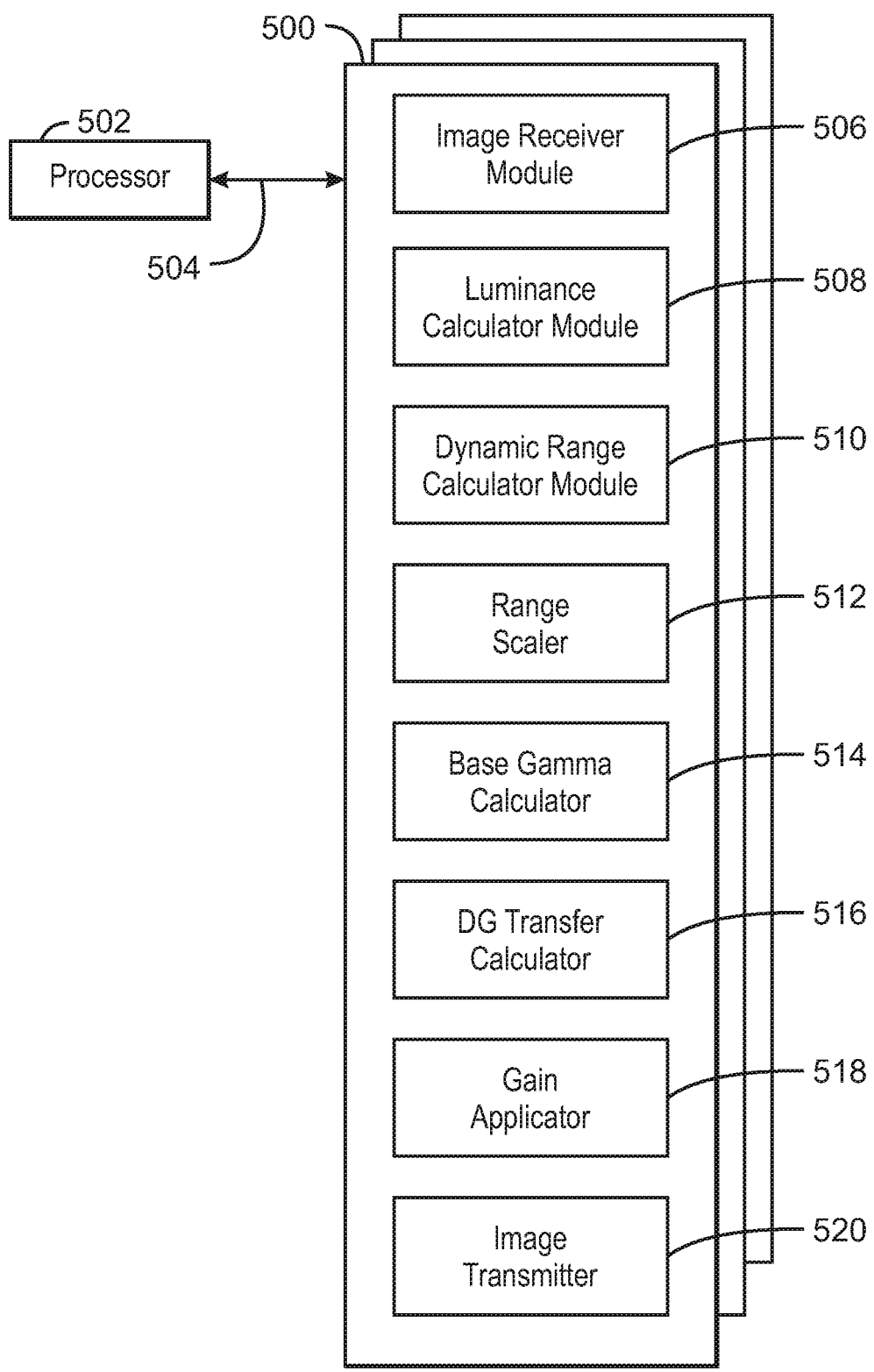
FIG. 5 is a block diagram showing computer readable media that store code for compressing dynamic range using a darkness gamma transfer function.

FIG. 5 is a block diagram showing computer readable media 500 that store code for compressing dynamic range using a darkness gamma transfer function. The computer readable media 500 may be accessed by a processor 502 over a computer bus 504. Furthermore, the computer readable medium 500 may include code configured to direct the processor 502 to perform the methods described herein. In some embodiments, the computer readable media 500 may be non-transitory computer readable media. In some examples, the computer readable media 500 may be storage media.

The various software components discussed herein may be stored on one or more computer readable media 500, as indicated in FIG. 5. For example, an image receiver module 506 may be configured to receive an input image with a high dynamic range. For example, the high dynamic range exceeds a dynamic range of a display device to display the compressed image. A luminance calculator module 508 may be configured to calculate luminance values of pixels of the input image. A dynamic range calculator module 510 may be configured to calculate an actual dynamic range of the input image based on luminance values of the input image. A range scaler module 512 may be configured to scale the high dynamic range of the input image. A base gamma calculator module 514 may be configured to iteratively calculate a base gamma to obtain a target brightness of the compressed image. For example, the base gamma calculator module 514 may be configured to iteratively calculate an average of an estimation image, calculate a base gamma adjustment, update a working image by applying a power function to the estimation image, update the base gamma value based on the calculated base gamma adjustment, calculate an absolute difference between the average of the estimation image and a target average level of brightness of the compressed image, and update a counter. A darkness gamma (DG) transfer function 516 may be configured to calculate gain values for each output pixel via a darkness gamma transfer function. A gain applicator 518 may be configured to apply gain values to color channel values of the input image to generate a compressed image. An image transmitter 520 may be configured to output the compressed image. For example, the image transmitter 520 may be configured to output the compressed image based on a received target gamma-correction function corresponding to a target display device or target image format.

The block diagram of FIG. 5 is not intended to indicate that the computer readable media 500 is to include all of the components shown in FIG. 5. Further, the computer readable media 500 may include any number of additional components not shown in FIG. 5, depending on the details of the specific implementation.

EXAMPLES

Example 1 is a system for compressing dynamic range. The system includes an image receiver to receive an input image with a high dynamic range. The system also includes a darkness gamma transfer calculator to calculate gain values for each output pixel via a darkness gamma transfer function. The system further includes a gain applicator to apply the gain values to color channel values of the input image to generate a compressed image.

Example 2 includes the system of example 1, including or excluding optional features. In this example, the system includes a luminance calculator to calculate luminance values of pixels of the input image.

Example 3 includes the system of any one of examples 1 to 2, including or excluding optional features. In this example, the system includes a dynamic range calculator to calculate an actual dynamic range of the input image based on luminance values of the input image.

Example 4 includes the system of any one of examples 1 to 3, including or excluding optional features. In this example, the range scaler is to also scale the high dynamic range of the input image.

Example 5 includes the system of any one of examples 1 to 4, including or excluding optional features. In this example, the system includes a base gamma calculator to iteratively calculate a base gamma to obtain a target brightness of the compressed image.

Example 6 includes the system of any one of examples 1 to 5, including or excluding optional features. In this example, the darkness gamma transfer calculator is to calculate the gain values using a two-part darkness gamma transfer function including a logarithmic function applied near zero and a power function applied over a rest of the high dynamic range.

Example 7 includes the system of any one of examples 1 to 6, including or excluding optional features. In this example, the system includes a base gamma calculator to iteratively calculate a base gamma value used to calculate the gain values, the base gamma calculator to iterate until a counter exceeds a threshold number or until a difference between an average brightness of an estimation image and a target average level of brightness of the compressed image exceeds a threshold difference.

Example 8 includes the system of any one of examples 1 to 7, including or excluding optional features. In this example, the system includes a base gamma calculator to iteratively calculate a base gamma value used to calculate the gain values, the base gamma calculator to iteratively: calculate an average of an estimation image; calculate a base gamma adjustment; update a working image by applying a power function to the estimation image; update the base gamma value based on the calculated base gamma adjustment; calculate an absolute difference between the average of the estimation image and a target average level of brightness of the compressed image; and update a counter.

Example 9 includes the system of any one of examples 1 to 8, including or excluding optional features. In this example, the high dynamic range exceeds a dynamic range of a display device to display the compressed image.

Example 10 includes the system of any one of examples 1 to 9, including or excluding optional features. In this example, the system includes an image processing unit or a system on chip.

Example 11 is a method for compressing dynamic range. The method includes receiving, via a processor, an input image with a high dynamic range. The method also includes calculating, via the processor, gain values for each output pixel via a darkness gamma transfer function. The method further includes applying, via the processor, the gain values to color channel values of the input image to generate a compressed image.

Example 12 includes the method of example 11, including or excluding optional features. In this example, the method includes calculating, via the processor, luminance values of pixels of the input image.

Example 13 includes the method of any one of examples 11 to 12, including or excluding optional features. In this example, the method includes calculating, via the processor, an actual dynamic range of the input image based on luminance values of the input image.

Example 14 includes the method of any one of examples 11 to 13, including or excluding optional features. In this example, the method includes scaling, via the processor, the high dynamic range of the input image.

Example 15 includes the method of any one of examples 11 to 14, including or excluding optional features. In this example, the method includes iteratively calculating, via the processor, a base gamma to obtain a target brightness of the compressed image.

Example 16 includes the method of any one of examples 11 to 15, including or excluding optional features. In this example, calculating the gain values includes using a two-part darkness gamma transfer function including a logarithmic function applied near zero and a power function applied over a rest of the high dynamic range.

Example 17 includes the method of any one of examples 11 to 16, including or excluding optional features. In this example, the method includes iteratively calculating, via the processor, a base gamma used to calculate the gain values, the processor to iteratively update the base gamma value until a counter exceeds a threshold number or until a difference between an average brightness of an estimation image and a target average level of brightness of the compressed image exceeds a threshold difference.

Example 18 includes the method of any one of examples 11 to 17, including or excluding optional features. In this example, the method includes iteratively calculating, via the processor, a base gamma used to calculate the gain values. Iteratively calculating the base gamma includes calculating an average of an estimation image; calculating a base gamma adjustment. Iteratively calculating the base gamma also includes updating a working image by applying a power function to the estimation image. Iteratively calculating the base gamma further includes updating the base gamma value based on the calculated base gamma adjustment. Iteratively calculating the base gamma also further includes calculating an absolute difference between the average of the estimation image and a target average level of brightness of the compressed image. Iteratively calculating the base gamma also includes updating a counter.

Example 19 includes the method of any one of examples 11 to 18, including or excluding optional features. In this example, the method includes using the compressed image for further image processing.

Example 20 includes the method of any one of examples 11 to 19, including or excluding optional features. In this example, the method includes outputting, via the processor, the compressed image based on a received target gamma-correction function.

Example 21 is an apparatus for compressing dynamic range. The apparatus includes an image receiver to receive an input image with a high dynamic range. The apparatus also includes a darkness gamma transfer calculator to calculate gain values for each output pixel via a darkness gamma transfer function. The apparatus further includes a gain applicator to apply the gain values to color channel values of the input image to generate a compressed image.

Example 22 includes the apparatus of example 21, including or excluding optional features. In this example, the apparatus includes a luminance calculator to calculate luminance values of pixels of the input image.

Example 23 includes the apparatus of any one of examples 21 to 22, including or excluding optional features. In this example, the apparatus includes a dynamic range calculator to calculate an actual dynamic range of the input image based on luminance values of the input image.

Example 24 includes the apparatus of any one of examples 21 to 23, including or excluding optional features. In this example, the range scaler is to also scale the high dynamic range of the input image.

Example 25 includes the apparatus of any one of examples 21 to 24, including or excluding optional features. In this example, the apparatus includes a base gamma calculator to iteratively calculate a base gamma to obtain a target brightness of the compressed image.

Example 26 includes the apparatus of any one of examples 21 to 25, including or excluding optional features. In this example, the darkness gamma transfer calculator is to calculate the gain values using a two-part darkness gamma transfer function comprising a logarithmic function applied near zero and a power function applied over a rest of the high dynamic range.

Example 27 includes the apparatus of any one of examples 21 to 26, including or excluding optional features. In this example, the apparatus includes a base gamma calculator to iteratively calculate a base gamma value used to calculate the gain values, the base gamma calculator to iterate until a counter exceeds a threshold number or until a difference between an average brightness of an estimation image and a target average level of brightness of the compressed image exceeds a threshold difference.

Example 28 includes the apparatus of any one of examples 21 to 27, including or excluding optional features. In this example, the apparatus includes a base gamma calculator to iteratively calculate a base gamma value used to calculate the gain values. The base gamma calculator is to iteratively calculate an average of an estimation image, calculate a base gamma adjustment, update a working image by applying a power function to the estimation image, update the base gamma value based on the calculated base gamma adjustment, calculate an absolute difference between the average of the estimation image and a target average level of brightness of the compressed image, and update a counter.

Example 29 includes the apparatus of any one of examples 21 to 28, including or excluding optional features. In this example, the high dynamic range exceeds a dynamic range of a display device to display the compressed image.

Example 30 includes the apparatus of any one of examples 21 to 29, including or excluding optional features. In this example, the apparatus includes an image processing unit or a system on chip.

Example 31 is a system for compressing dynamic range. The system includes means for receiving an image with a high dynamic range. The system includes means for calculating gain values for each output pixel. The system includes means for applying the gain values to color channel values of the input image to generate a compressed image.

Example 32 includes the system of example 31, including or excluding optional features. In this example, the system includes means to calculate luminance values of pixels of the input image.

Example 33 includes the system of any one of examples 31 to 32, including or excluding optional features. In this example, the system includes means to calculate an actual dynamic range of the input image based on luminance values of the input image.

Example 34 includes the system of any one of examples 31 to 33, including or excluding optional features. In this example, the system includes means to scale the high dynamic range of the input image.

Example 35 includes the system of any one of examples 31 to 34, including or excluding optional features. In this example, the system includes means to iteratively calculate a base gamma to obtain a target brightness of the compressed image.

Example 36 includes the system of any one of examples 31 to 35, including or excluding optional features. In this example, the means for calculating the gain values is to calculate the gain values using a two-part darkness gamma transfer function including a logarithmic function applied near zero and a power function applied over a rest of the high dynamic range.

Example 37 includes the system of any one of examples 31 to 36, including or excluding optional features. In this example, the system includes means for iteratively calculating a base gamma value used to calculate the gain values, the means for iteratively calculating the base gamma value to iterate until a counter exceeds a threshold number or until a difference between an average brightness of an estimation image and a target average level of brightness of the compressed image exceeds a threshold difference.

Example 38 includes the system of any one of examples 31 to 37, including or excluding optional features. In this example, the system includes means for iteratively calculating a base gamma value used to calculate the gain values, the means for iteratively calculating the base gamma value to iteratively: calculate an average of an estimation image; calculate a base gamma adjustment; update a working image by applying a power function to the estimation image; update the base gamma value based on the calculated base gamma adjustment; calculate an absolute difference between the average of the estimation image and a target average level of brightness of the compressed image; and update a counter.

Example 39 includes the system of any one of examples 31 to 38, including or excluding optional features. In this example, the high dynamic range exceeds a dynamic range of a display device to display the compressed image.

Example 40 includes the system of any one of examples 31 to 39, including or excluding optional features. In this example, the system includes an image processing unit or a system on chip.

Example 41 is at least one computer readable medium for compressing dynamic range having instructions stored therein that. The computer-readable medium includes instructions that direct the processor to receive an input image with a high dynamic range. The computer-readable medium also includes instructions that direct the processor to calculate gain values for each output pixel via a darkness gamma transfer function. The computer-readable medium further includes instructions that direct the processor to apply the gain values to color channel values of the input image to generate a compressed image.

Example 42 includes the computer-readable medium of example 41, including or excluding optional features. In this example, the computer-readable medium includes instructions to calculate luminance values of pixels of the input image.

Example 43 includes the computer-readable medium of any one of examples 41 to 42, including or excluding optional features. In this example, the computer-readable medium includes instructions to calculate an actual dynamic range of the input image based on luminance values of the input image.

Example 44 includes the computer-readable medium of any one of examples 41 to 43, including or excluding optional features. In this example, the computer-readable medium includes instructions to scale the high dynamic range of the input image.

Example 45 includes the computer-readable medium of any one of examples 41 to 44, including or excluding optional features. In this example, the computer-readable medium includes instructions to iteratively calculate a base gamma to obtain a target brightness of the compressed image.

Example 46 includes the computer-readable medium of any one of examples 41 to 45, including or excluding optional features. In this example, the computer-readable medium includes instructions to calculate the gain values using a two-part darkness gamma transfer function including a logarithmic function applied near zero and a power function applied over a rest of the high dynamic range.

Example 47 includes the computer-readable medium of any one of examples 41 to 46, including or excluding optional features. In this example, the computer-readable medium includes instructions to iteratively calculate a base gamma used to calculate the gain values, the processor to iteratively update the base gamma value until a counter exceeds a threshold number or until a difference between an average brightness of an estimation image and a target average level of brightness of the compressed image exceeds a threshold difference.

Example 48 includes the computer-readable medium of any one of examples 41 to 47, including or excluding optional features. In this example, the computer-readable medium includes instructions to iteratively: calculate an average of an estimation image, calculate a base gamma adjustment; update a working image by applying a power function to the estimation image, update the base gamma value based on the calculated base gamma adjustment, calculate an absolute difference between the average of the estimation image and a target average level of brightness of the compressed image, and update a counter.

Example 49 includes the computer-readable medium of any one of examples 41 to 48, including or excluding optional features. In this example, the computer-readable medium includes instructions to use the compressed image for further image processing.

Example 50 includes the computer-readable medium of any one of examples 41 to 49, including or excluding optional features. In this example, the computer-readable medium includes instructions to output the compressed image based on a received target gamma-correction function.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for compressing dynamic range, comprising:
   memory;
   instructions;
   processor circuitry to execute the instructions to:
      access an input image with a high dynamic range;
      iteratively calculate a base gamma value to obtain a target brightness of a compressed image;
      calculate gain values for each output pixel via a darkness gamma transfer function; and
      apply the gain values to color channel values of the input image to generate the compressed image.

2. The system of claim 1, wherein the processor circuitry is to calculate luminance values of pixels of the input image.

3. The system of claim 1, wherein the processor circuitry is to calculate an actual dynamic range of the input image based on luminance values of the input image.

4. The system of claim 1, wherein the processor circuitry is to also scale the high dynamic range of the input image.

5. The system of claim 1, wherein the processor circuitry is to calculate the gain values using a two-part darkness gamma transfer function including a logarithmic function applied near zero and a power function applied over a rest of the high dynamic range.

6. The system of claim 1, wherein the processor circuitry is to iterate the calculation of the base gamma value until a counter exceeds a threshold number or until a difference between an average brightness of an estimation image and a target average level of brightness of the compressed image exceeds a threshold difference.

7. The system of claim 1, wherein the processor circuitry is to iteratively calculate the base gamma value used to calculate the gain values by iteratively:
   calculating an average of an estimation image;
   calculating a base gamma adjustment;
   updating a working image by applying a power function to the estimation image;
   updating the base gamma value based on the calculated base gamma adjustment;
   calculating an absolute difference between the average of the estimation image and a target average level of brightness of the compressed image; and
   updating a counter.

8. The system of claim 1, wherein the high dynamic range exceeds a dynamic range of a display device to display the compressed image.

9. The system of claim 1, wherein the processor circuitry is associated with at least one of an image processing unit or a system on chip.

10. A method for compressing dynamic range, comprising:
- receiving, via processor circuitry, an input image with a high dynamic range;
- iteratively calculating, via the processor circuitry, a base gamma value to obtain a target brightness of a compressed image;
- calculating, via the processor circuitry, gain values for each output pixel via a darkness gamma transfer function; and
- applying, via the processor circuitry, the gain values to color channel values of the input image to generate the compressed image.

11. The method of claim 10, further including calculating, via the processor circuitry, luminance values of pixels of the input image.

12. The method of claim 10, further including calculating, via the processor circuitry, an actual dynamic range of the input image based on luminance values of the input image.

13. The method of claim 10, further including scaling, via the processor circuitry, the high dynamic range of the input image.

14. The method of claim 10, wherein calculating the gain values includes using a two-part darkness gamma transfer function including a logarithmic function applied near zero and a power function applied over a rest of the high dynamic range.

15. The method of claim 10, wherein iteratively calculating the base gamma value used to calculate the gain values includes iteratively updating the base gamma value until a counter exceeds a threshold number or until a difference between an average brightness of an estimation image and a target average level of brightness of the compressed image exceeds a threshold difference.

16. The method of claim 10, wherein iteratively calculating the base gamma value includes:
- calculating an average of an estimation image;
- calculating a base gamma adjustment;
- updating a working image by applying a power function to the estimation image;
- updating the base gamma value based on the calculated base gamma adjustment;
- calculating an absolute difference between the average of the estimation image and a target average level of brightness of the compressed image; and
- updating a counter.

17. The method of claim 10, further including using the compressed image for further image processing.

18. The method of claim 10, further including outputting, via the processor circuitry, the compressed image based on a received target gamma-correction function.

19. At least one computer readable storage device for compressing dynamic range having instructions stored therein that, in response to being executed on a computing device, cause the computing device to:
- receive an input image with a high dynamic range;
- iteratively calculate a base gamma value to obtain a target brightness of a compressed image;
- calculate gain values for each output pixel via a darkness gamma transfer function; and
- apply the gain values to color channel values of the input image to generate the compressed image.

20. The at least one computer readable storage device of claim 19, wherein the instructions cause the computing device to calculate luminance values of pixels of the input image.

21. The at least one computer readable storage device of claim 19, wherein the instructions cause the computing device to calculate an actual dynamic range of the input image based on luminance values of the input image.

22. The at least one computer readable storage device of claim 19, wherein the instructions cause the computing device to scale the high dynamic range of the input image.

* * * * *